Oct. 25, 1949.　　　D. F. CHRISTOFFER　　　2,485,702
TRIP ROPE HOLDER
Filed Jan. 7, 1946
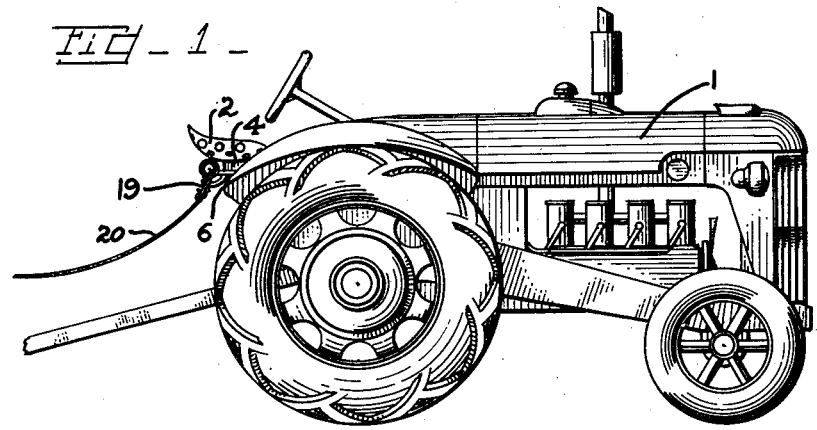
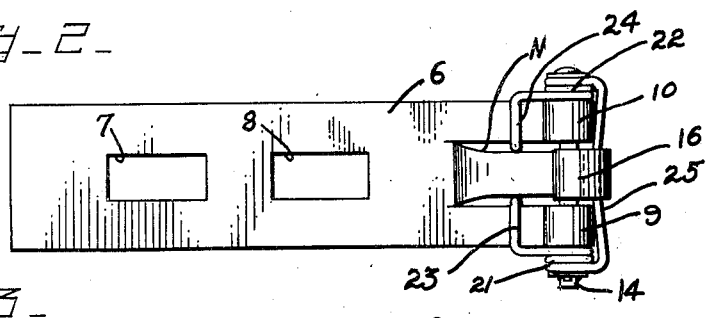
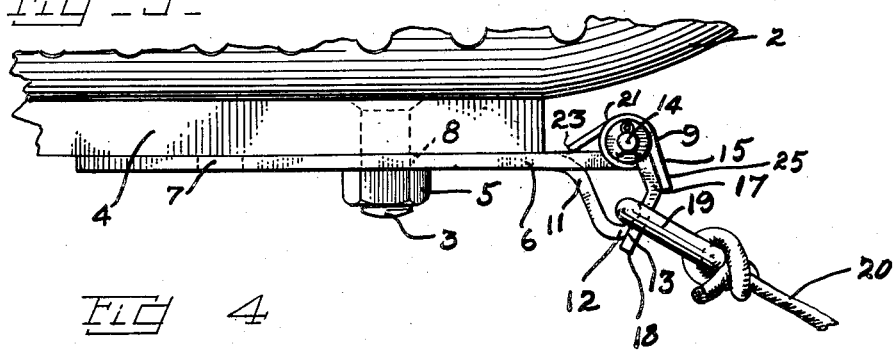
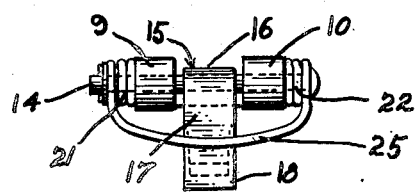
Inventor
*Donald F. Christoffer*
By *Clarence A. O'Brien
and Harvey B. Jacobson*
Attorneys Patented Oct. 25, 1949

2,485,702

UNITED STATES PATENT OFFICE 2,485,702

TRIP ROPE HOLDER

Donald F. Christoffer, Spirit Lake, Iowa

Application January 7, 1946, Serial No. 639,687

1 Claim. (Cl. 280—150)

This invention relates to improvements in devices for automatically releasing farm machinery trip ropes from connection with a tractor on tractor drawn plows wherein an automatic releasing spring tension connection is provided between the plow and tractor, so that in the event the plow strikes an obstruction sufficient to cause the release of the plow from the tractor, the trip rope holding mechanism will permit the release of the trip rope to prevent possible breakage of the equipment.

An object of the invention is to provide a plow trip rope releasing device which will be highly efficient and positive in operation, and relatively inexpensive to manufacture and produce.

A further object of the invention is to provide a device for releasing plow and other farm machinery trip ropes which is formed of a small number of inexpensive parts which will combine to produce a practical device which will meet all of the requirements for a successful commercial use.

Other objects will appear as the description proceeds.

In the accompanying drawings which form a part of this application,

Figure 1 is a side elevation of a farm tractor showing the trip rope releasing device secured thereon;

Figure 2 is a plan view of the trip rope releasing device;

Figure 3 is an enlarged side elevation of the trip rope releasing device showing the same attached to a tractor seat, and Figure 4 is an end elevation of the improved trip rope releasing device.

Like characters of reference are used throughout the following specification and the accompanying drawings to designate corresponding parts.

In carrying out the invention, a farm tractor is illustrated and is generally designated by the reference numeral 1, and is provided with a seat 2, the same being supported by a single bolt 3 secured to the seat and depending therebelow to extend through the seat supporting standard 4, and to be held thereon by the nuts 5.

The instant invention includes a plate 6 having spaced apertures 7 and 8 through which the bolt 3 for supporting the seat may extend, to adjustably mount the plate next to the standard 4, as clearly shown in Figure 3 of the drawings.

The outer end of the plate 6 is longitudinally bifurcated and split in two places, to form three adjacent end portions. The outer end portions are bent upwardly to form the spaced bearing eyes 9 and 10, while the central portion is bent downwardly and narrowed as at 11, and is shaped at its lower extremity to form the rounded seat portion 12, and an end shoulder or stop 13, clearly shown in Figure 3 of the drawings.

A cross pin 14 is positioned in and between the bearing eyes 9 and 10, and pivotally supports the locking finger 15 which is formed with a bearing collar 16 adapted to be disposed over the cross pin 14, and a downwardly extending portion 17 which has its terminal end 18 bent forwardly to engage the parallel extending edge of the shoulder or stop 13 on the depending central finger portion 11.

A ring 19 is secured to a plow trip rope 20, and is adapted to be received in the seat portion 12 of the finger 11, and to be held therein by the portion or finger 17.

A spring element for tensioning the portion or finger 17 to force the same against the shoulder or stop 13 is provided and comprises the spaced coils 21 and 22 which extend around the cross pin 14 at the outer side of the bearing eyes 9 and 10 and have their ends 23 and 24 bent at right angles and inwardly to extend over the two end portions of the plate 6 upon which the eyes 9 and 10 are formed. The spring coils 21 and 22 are connected by means of the loop 25 which extends across the locking finger 17 and in contact therewith, to resiliently tension and force the same against the said shoulder or stop 13. From the foregoing description, it will be apparent that the spring tensioned finger 17 will be pulled away from the shoulder 13, and the ring 19 secured to the end of the plow trip rope 20 will be inserted between the said finger 17 and shoulder 13, to seat in the seat portion 12. The tension of the springs in contact with the portion 17 will be sufficient to hold the same against the shoulder 13 and to retain the ring 19 within the holder until it is deliberately removed therefrom, or until the tractor drawn plow engages some large obstruction in the ground which will tend to separate the plow from the tractor, at which time the plow trip rope 20 will be yanked and the ring 19 will be pulled against the locking finger 17 against the action of the spring, to be pulled loose from the holder, thereby preventing any possible damage to the equipment. The trip rope may also be used with other types of farm machinery where trip ropes are used between the machine and the tractor pulling the same.

While the preferred embodiment of the invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A trip rope holder comprising a longitudinally extending body plate bifurcated at its rear end to form transversely extending spaced aligned bearing eyes and a centrally disposed depending finger having a substantially vertical stop shoulder on its lower end, a pivot pin extending between said aligned bearing eyes, a depending rearwardly extending trip rope ring supporting finger pivotally supported upon said pivot pin between said bearing eyes formed with an angled forwardly and downwardly extending lower terminal end adapted to abut said vertical stop shoulder, a trip rope having a ring secured thereto supported by said trip rope ring supporting finger, and resilient tensioning means on said pivot pin anchored to the bifurcated ends of said body plate and engageable with said trip rope ring supporting finger for resiliently urging the same into engagement with said stop shoulder.

DONALD F. CHRISTOFFER.

REFERENCES CITED

The following references are of record in the file of this patent:

UNITED STATES PATENTS

| Number | Name | Date |
|---|---|---|
| 589,034 | Schellhammer | Aug. 31, 1897 |
| 1,682,994 | Simon | Sept. 4, 1928 |
| 2,370,232 | Creekbaum | Feb. 27, 1945 |